(12) United States Patent
Saito (10) Patent No.: US 7,558,025 B2
(45) Date of Patent: Jul. 7, 2009

(54) APPARATUS FOR PROTECTING HEAD SUSPENSION ASSEMBLY

(75) Inventor: Tetsuo Saito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 372 days.

(21) Appl. No.: 11/649,056

(22) Filed: Jan. 3, 2007

(65) Prior Publication Data

US 2008/0043373 A1 Feb. 21, 2008

(30) Foreign Application Priority Data

Aug. 15, 2006 (JP) .............................. 2006-221679

(51) Int. Cl.
*G11B 21/22* (2006.01)
(52) U.S. Cl. .................... 360/265; 29/603.03
(58) Field of Classification Search .......... 360/265, 360/265.7, 254, 244.5; 29/603.02, 603.03, 29/603.06, 603.07
See application file for complete search history.

(56) References Cited

U.S. PATENT DOCUMENTS 6,185,075 B1 * 2/2001 Tsujino et al. ............ 360/265.7
6,950,283 B2 * 9/2005 Macpherson et al. ..... 360/265.7
7,480,982 B2 * 1/2009 Hosaka et al. ............ 29/603.06
2003/0128477 A1 * 7/2003 Macpherson et al. ..... 360/265.7
2005/0188531 A1 * 9/2005 Shu et al. .................. 29/603.03

FOREIGN PATENT DOCUMENTS

JP 2001-035098 2/2001
JP 2005-174459 6/2005

* cited by examiner

*Primary Examiner*—Angel A. Castro
(74) *Attorney, Agent, or Firm*—Greer, Burns & Crain, Ltd.

(57) ABSTRACT

An apparatus for protecting a head suspension assembly includes an actuator unit including a plurality of suspensions to which a plurality of heads are fixed, respectively, an actuator block, and a coil-arm unit including a coil. A first protection member includes a first support unit that supports a part of the actuator unit. A second support unit supports a connector provided at a cable extending from a part of the actuator unit. A second protection member includes a fixing unit that fixes the connector to a predetermined position. The first protection member and the second protection member are formed in freely opening and closing manner.

6 Claims, 9 Drawing Sheets

APPARATUS FOR PROTECTING HEAD SUSPENSION ASSEMBLY

BACKGROUND OF THE INVENTION

1. Field of the Invention

The present invention generally relates to a technology for protecting a head suspension assembly of a hard disk drive (HDD) installed in a larger-size general-purpose computer.

2. Description of the Related Art

A head suspension assembly (HSA) has been conventionally employed in a hard disk drive (HDD) provided in a main frame or the like to write or read (record or reproduce) information to or from a magnetic disk.

Figure 10:
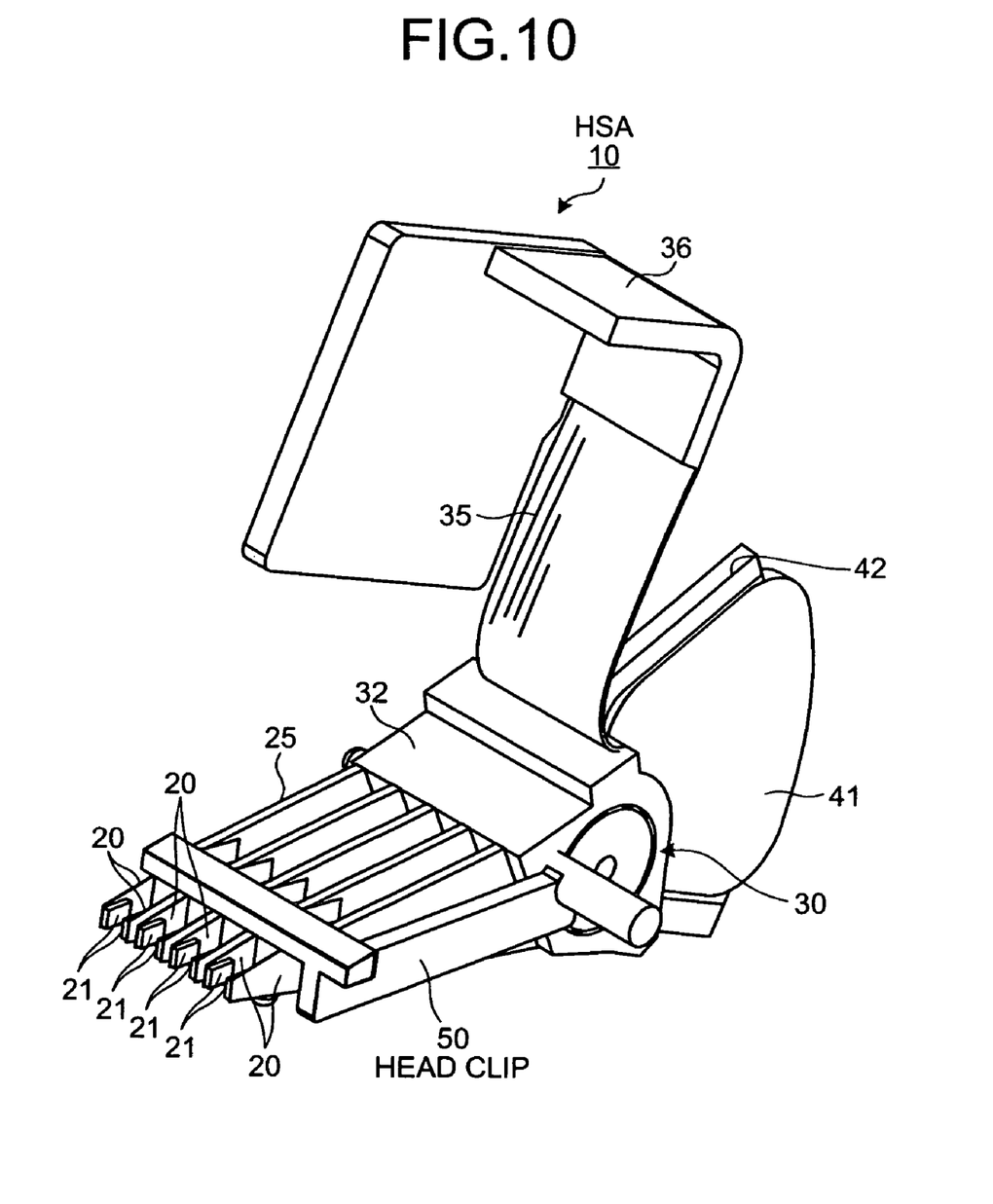
FIG. 10 is a perspective view of a conventional HSA.

FIG. 10 is a perspective view of the conventional HSA 10. As shown in FIG. 10, the HSA 10 includes an actuator unit 25 that includes a plurality of suspensions 20 (eight in the example shown in FIG. 10), an actuator block 30, and a coil support 42 that holds a voice coil 41.

A flexible printed circuit (FPC) cable 35 extends to a part of a pivot housing 32 that constitutes the actuator block 30, and an L-connector 36 is attached to an end of the FPC cable 35.

A head clip 50 is provided at front positions of the suspensions 20 to prevent contact among a plurality of magnetic heads 21 (eight in the example shown in FIG. 10) provided on tip ends of the respective suspensions 20 with one another. In the HSA 10 shown in FIG. 10, the magnetic heads 21 provided on the tip ends of the suspensions 20 can record or reproduce information (data) to or from front and rear surfaces of four disks, respectively.

For example, if an operator directly touches the HSA 10 employed in the HDD, flaws such as adhesion of dust and electrostatic discharge (ESD) breakdown may possibly occur. Therefore, it is necessary to take due care of handling and transport of the HSA 10.

As a conventional protecting apparatus for preventing damage and breaking of the HSA of this type during manufacturing or transport, a jig for an HSA (hereinafter, "HSA jig") is disclosed in, for example, Japanese Patent Application Laid-Open No. 2005-174459. The HSA jig is configured so that a spherical protrusion is located between recesses (negative-pressure generating units) of magnetic head sliders opposed to each other. According to Japanese Patent Application Laid-Open No. 2005-174459, even if one of the magnetic head slider strikes against the HSA jig due to vibration, the spherical protrusion of the HSA jig contacts with the negative-pressure generating unit of the respective magnetic head slider. The surface of the magnetic head slider does not, therefore, directly contact with the HSA jig. The damage and breaking of the magnetic head sliders and the like can be thereby prevented.

As another conventional technique, a method of machining an actuator that drives a magnetic head employed in an HDD and a machining jig are disclosed in, for example, Japanese Patent Application Laid-Open No. 2001-35098. With the method, one pivot pin is provided using the shaft hole of a carriage, and another pivot pin is provided on the fixed shaft of the mobile coil of an actuator. Moreover, protection plates are attached onto the respective pivot pins. According to Japanese Patent Application Laid-Open No. 2001-35098, deformation and the like of a head arm and the mobile coil can be prevented during machining, and the actuator for the HDD having a stable structure can be manufactured.

However, the conventional techniques related to the HSA protection have the following disadvantages. Despite the measures for protecting the HSA, the problems such as the adhesion of dust to the HSA and the damage and deformation of the suspensions during transport of the HSA still remain unsolved.

Operativity is considerably low if the operator handles the HSA 10 configured in the above manner with one hand. Besides, to transport the HSA 10 to the next operation step, the HSA 10 is done so in an exposed state. This disadvantageously produces the problem of damaging the HSA 10 due to the contact between the actuator unit 25 or the actuator block 30 and the L-connector 36 or the like. Moreover, even if the manufactured HSAs 10 are simply disposed on a predetermined location to store them, the problem of low stability disadvantageously occurs.

Furthermore, to manufacture the HSA 10, the comb-like head clip 50 is attached to the suspensions 20 to prevent the contact among the magnetic heads 21 fixed to the respective suspensions 20. Meanwhile, to manufacture the HSA 10, a cleaning step using cleaning water is performed in the manufacturing process for the HSA 10. The head clip 50 is often, disadvantageously detached from the HSA 10 by water pressure in the middle of the cleaning step. This disadvantageously causes the damage of the magnetic head 21. Moreover, the head clip 50 is possibly detached from the HSA 10 even during transport of the HSA 10. Measures for preventing detachment of the head clip 50 are, therefore, desired.

SUMMARY OF THE INVENTION

It is an object of the present invention to at least partially solve the problems in the conventional technology.

An apparatus according to one aspect of the present invention is for protecting a head suspension assembly that includes an actuator unit including a plurality of suspensions to which a plurality of heads are fixed, respectively, an actuator block, and a coil-arm unit including a coil. The apparatus includes a first protection member including a first support unit that supports a part of the actuator unit, and a second support unit that supports a connector provided at a cable extending from a part of the actuator unit; and a second protection member including a fixing unit that fixes the connector to a predetermined position. The first protection member and the second protection member are formed in freely opening and closing manner.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be explained in detail below with reference to the accompanying drawings. It is to be noted that the present invention is not limited to the present embodiments.

Figure 1:
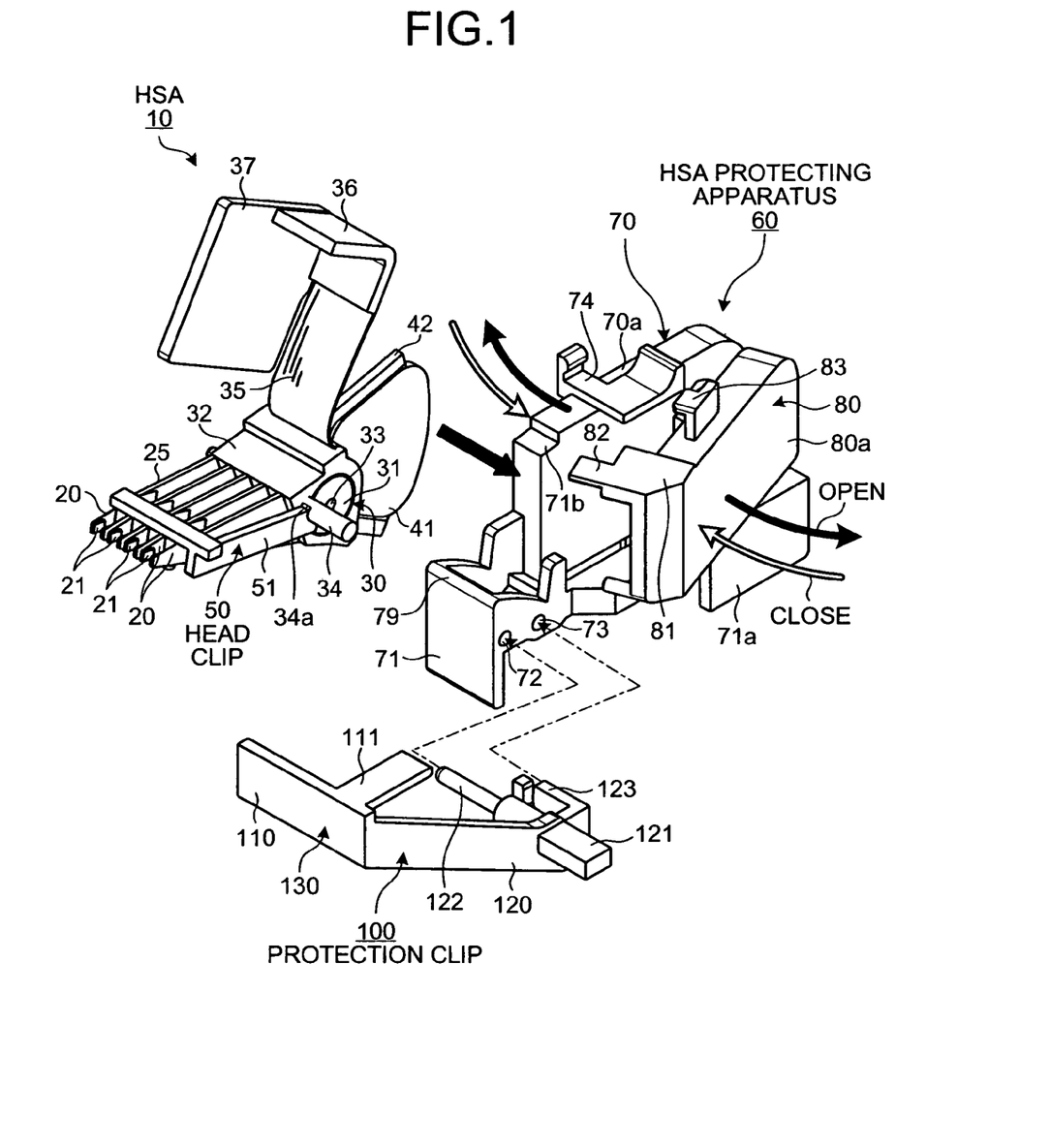
FIG. 1 is a perspective view of an HSA and an HSA protecting apparatus according to an embodiment of the present invention.
Figure 2:
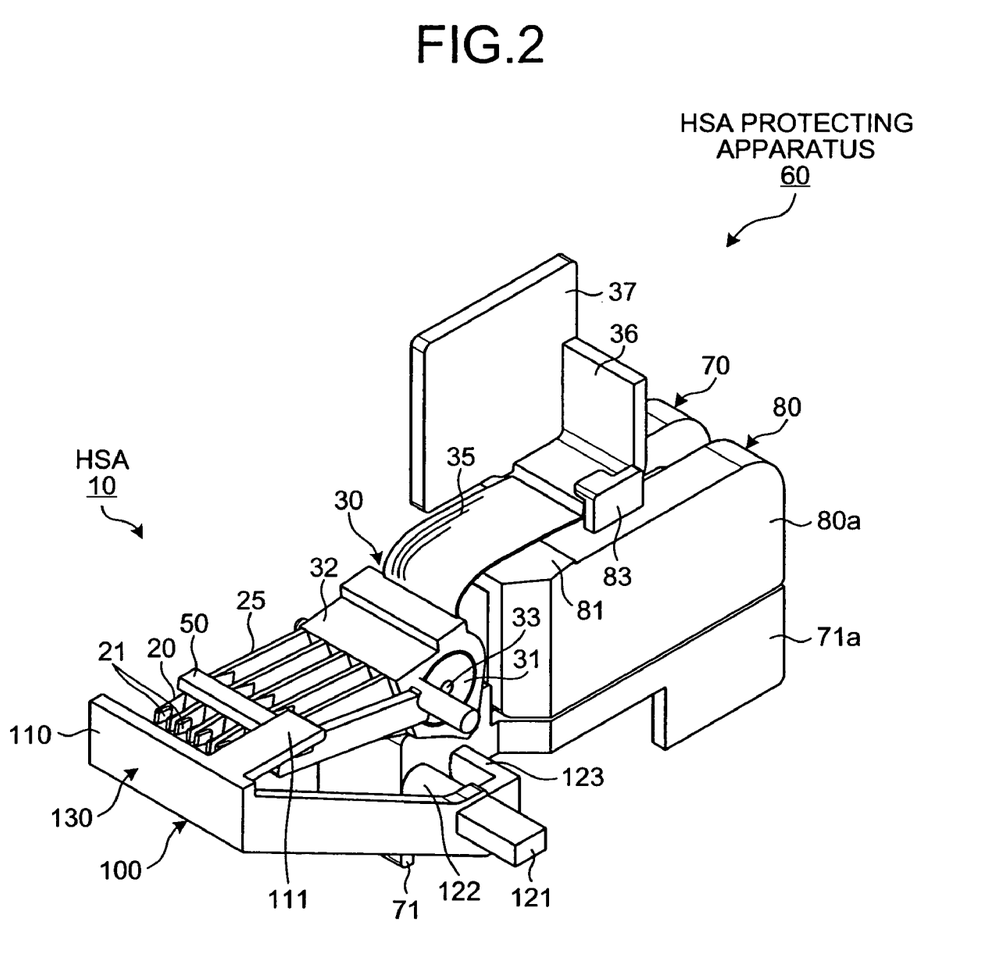
FIG. 2 is a perspective view of the HSA protecting apparatus on which the HSA is mounted and to which a protection clip is attached.
Figure 3:
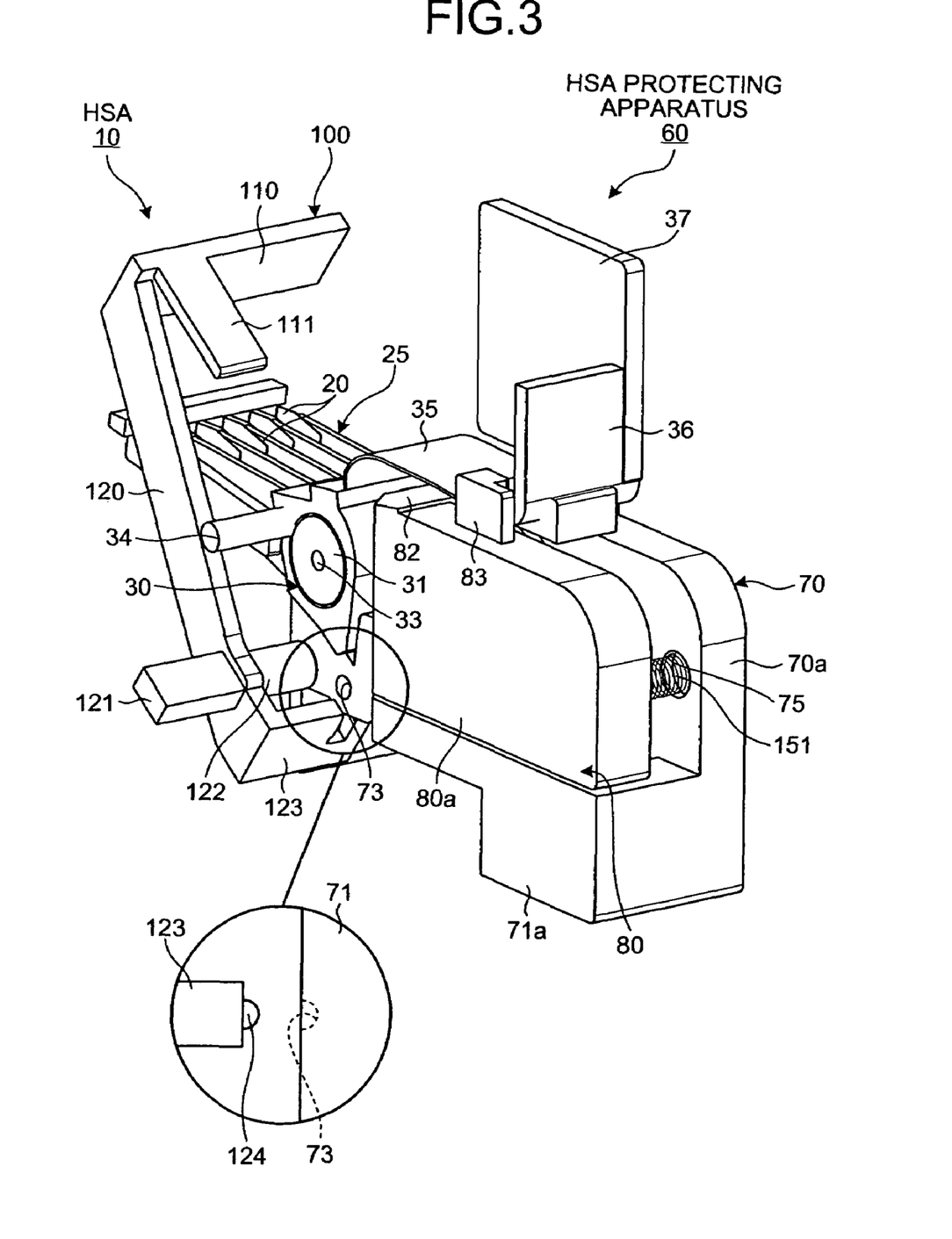
FIG. 3 is a perspective back view of the HSA protecting apparatus shown in FIG. 1.

FIG. 1 is a perspective view of the HSA 10, a head-suspension-assembly (HSA) protecting apparatus 60, and a protection clip 100 according to the present embodiment. FIG. 2 is a perspective view of the HSA 10, the HSA protecting apparatus 60 mounted on the HSA 10, and the protection clip 100 attached to the HSA 10. FIG. 3 is a perspective back view of the HSA protecting apparatus 60.

As shown in FIG. 1, the HSA protecting apparatus 60 according to the present embodiment includes a first protection member 70 and a second protection member 80 each configured to be freely open/closed. The HSA protecting apparatus 60 is characterized as follows. The HSA 10 is held between the first and second protection members 70 and 80 from both sides of the HSA 10, thereby mounting the HSA 10 into the HSA protecting apparatus 60 and preventing deformation of the suspensions 20, damage of the magnetic heads 21, and the like.

Specifically, when the first protection member 70 and the second protection member 80 are closed toward each other, a first support 71 of the first protection member 70 can support the actuator unit 25 that includes the suspensions 20 and the actuator block 30.

A connector support 74 provided on the first protection member 70 can support the L-connector 36 provided on an end of the FPC cable 35 extending from part of the actuator block 30 at a predetermined position. Furthermore, a connector lock 83 provided on the second protection member 80 can fix the L-connector 36 to the predetermined position. Moreover, a main body 70a of the first protection member 70 and a main body 80a of the second protection member 80 can hold the coil support 42 including the voice coil 41.

As shown in FIGS. 1 to 3, the protection clip 100 can be separately attached to the HAS protecting apparatus 60. The protection clip 100 protects the head clip 50 attached to the HSA 10 during manufacturing of the HSA 10 from being detached from the HSA 10. The head clip 50 is a protector fixedly attached to the HSA 10 during manufacturing of the HSA 10. The head clip 50 can prevent contact and damage of the magnetic heads 21 of the respective suspensions 20.

The HSA 10 includes the actuator unit 25 including a plurality of suspensions 20 (eight in the present embodiment) and the actuator block 30.

The suspensions 20 are provided to be aligned in a comb-like shape, and the magnetic heads 21 that reproduce/record data from/on a disk are provided on the tip ends of the respective suspensions 20. The rear end of the actuator unit 25 is fixedly connected to the actuator block 30. The suspensions 20 can be manufactured each by drawing a stainless plate or aluminum and then machining the drawn stainless plate or aluminum into a predetermined shape.

The actuator block 30 includes the pivot housing 32 including a pivot bearing 31 and the coil support 42 that holds the voice coil 41 in the flat shape fixed to the rear end (lower side in FIG. 1) of the pivot housing 32.

A voice yoke (not shown) that constitutes, together with the voice coil 41, a voice coil motor is arranged on the rear end (lower side in FIG. 1) of the pivot housing 32. A permanent magnet (not shown), which is provided in the voice coil yoke, forms an electromagnetic field.

The suspensions 20 can rotate around a pivot shaft 33 of the pivot bearing 31 provided in the pivot housing 32. The actuator unit 25 including the suspensions 20 and the actuator block 30 can be supported by the first support 71 of the first protection member 70 that constitutes the HSA protecting apparatus 60.

The FPC cable 35 extends from the upper surface (upper side in FIG. 1) of the pivot housing 32, and the L-connector 36 is provided on the end of the FPC cable 35. An attachment plate 37 is fixed to the L-connector 36. The attachment plate 37 functions as an attachment to which a component of an assembling apparatus to be used when the HSA 10 is assembled is attached.

The FPC cable 35 is constituted by a flexible resin film such as polyethylene terephthalate (PET), a conductor wiring formed into a pattern by a copper foil on the upper surface of the flexible resin film, and a protection layer that covers up the conductor wiring. The L-connector 36 provided on the end of the FPC cable 35 can be supported by the connector support 74 provided on the first protection member 70 that constitutes the HSA protecting apparatus 60.

A pin 34 is fixedly provided on one end (right side in FIG. 1) of the pivot housing 32, a recess 34a is formed in a part of the pin 34, and an arm 51 of the generally L-shaped head clip 50 is fitted into the recess 34a. As explained above, the head clip 50 serves as a protection member fixedly attached to the HSA 10 during manufacturing of the HSA 10. The head clip 50 can prevent contact among the magnetic heads 21 of the respective suspensions 20 and damage of the magnetic heads 21.

As shown in FIG. 1, the protection clip 100 is formed into the generally L shape. The protection clip 100 is constituted by an arm member 130 that includes a parallel plate 110 arranged to cover front portions of the magnetic head 21 and an oblique plate 120. A claw plate 111 extending inward is formed on one side of the parallel plate 110.

Specifically, the parallel plate 110 can prevent front ends (right sides in FIG. 1) of the magnetic heads 21 from contacting with the other components. The claw plate 111 can prevent detachment of the head clip 50 attached to the suspensions 20.

Furthermore, a grip 121 that is fixedly provided outward and with which a user grips the head clip 50, a pin 122 fixedly provided inward, and a bent portion 123 bent from a proximal end of the oblique plate 120 almost at right angle are provided on the surface of the proximal end of the oblique plate 120. A circular convex portion 124 is formed on an inner-end surface of the bent portion 123 as shown in FIG. 3.

If the protection clip 100 is to be attached to the HSA protecting apparatus 60, then the pin 122 is inserted into a circular insertion hole 72 formed in the side surface of the first support 71, and the circular convex portion 124 formed in the bent portion 123 is fitted into a circular concave hole 73 formed in a side surface of the first support 71.

By doing so, the protection clip 100 can be attached to the HSA protecting apparatus 60. If the protection clip 100 is attached to the HSA protecting apparatus 60 in this manner, it is possible to ensure protecting detachment of the head clip 50 due to certain external force or contact of the protection clip 100 with the other member.

If the HSA 10 thus configured is employed, the magnetic heads 21 (eight in the example shown in FIG. 1) provided on the respective suspensions 20 can record/reproduce information on/from front and rear surfaces of four disks.

Figure 4:
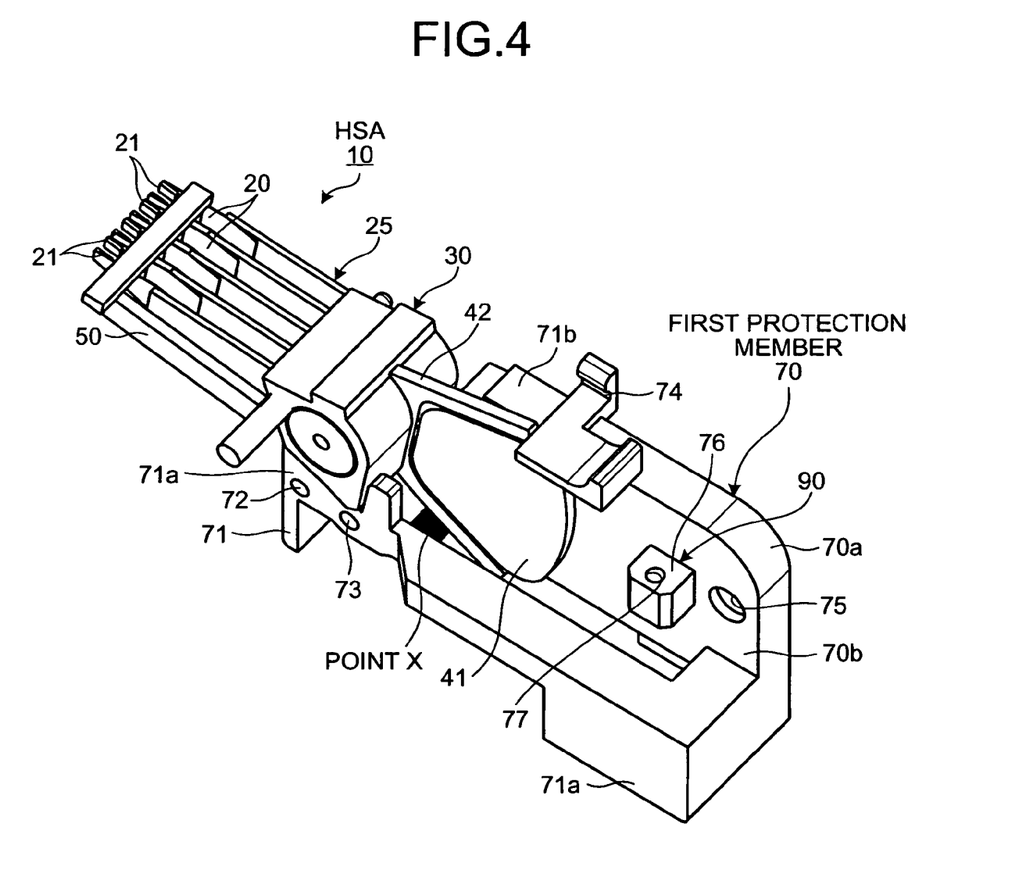
FIG. 4 is a perspective view of a first protection member included in the HSA protecting apparatus shown in FIG. 1.
Figure 5:
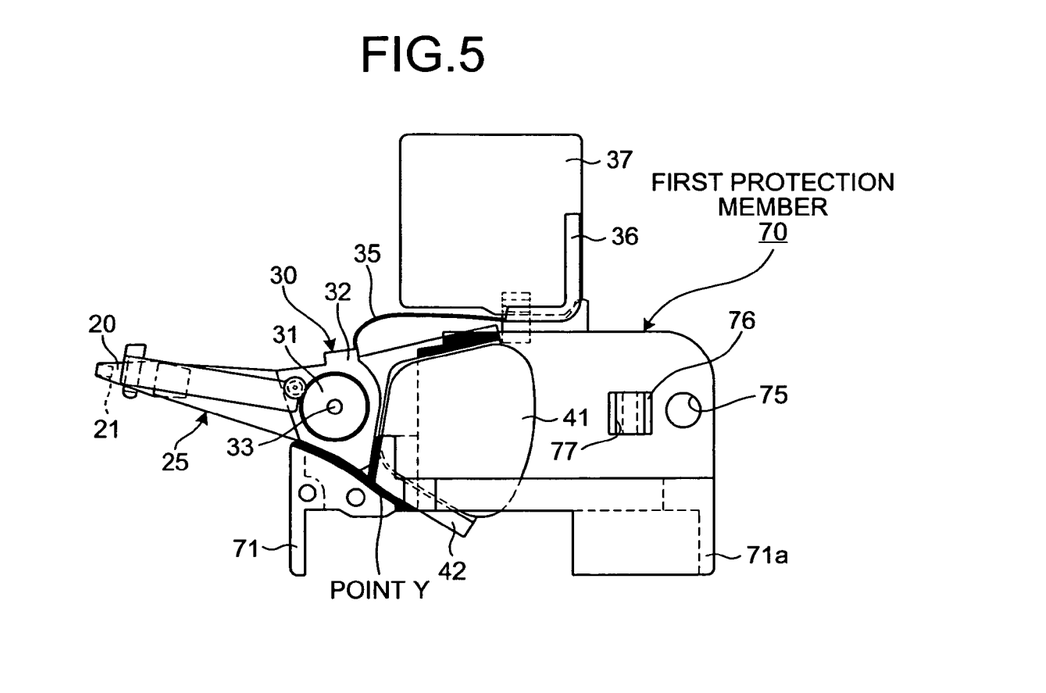
FIG. 5 is a plan view of the first protection member.
Figure 6:
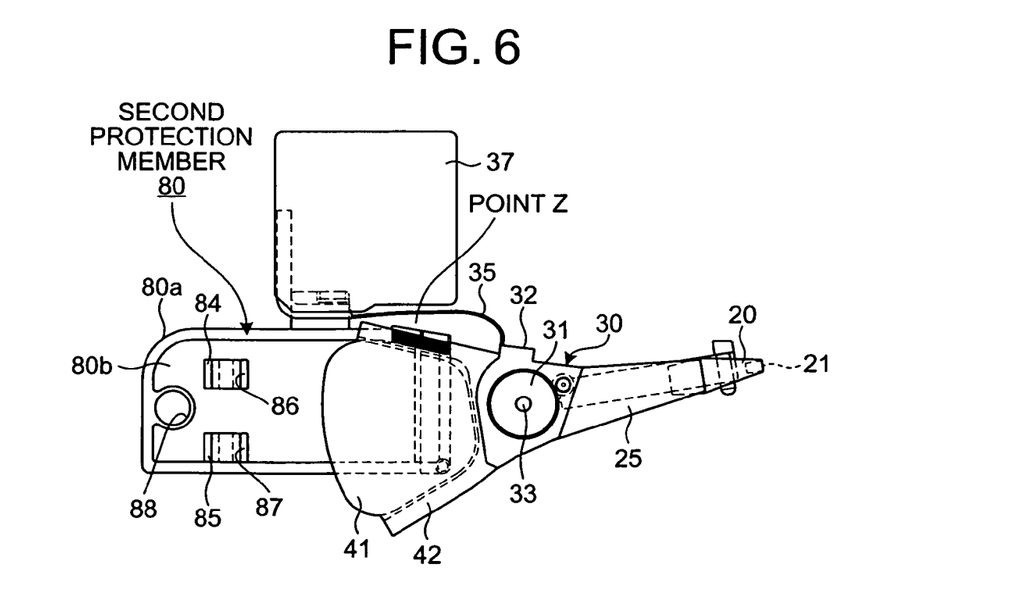
FIG. 6 is a plan view of a second protection member included in the HSA protecting apparatus shown in FIG. 1.

FIG. 4 is a perspective view of the first protection member 70 for explaining the entire configuration of the first protection member 70. FIG. 5 is a plan view of the first protection member 70 for explaining the entire configuration of the first protection member 70. FIG. 6 is a plan view of the second protection member 80 for explaining the entire configuration of the second protection member 80. In FIGS. 4 to 6, points X, Y, and Z indicate portions in which the HSA protecting apparatus 60 grasps and contacts with the actuator block 30.

As shown in FIGS. 1 to 7, the HSA protecting apparatus 60 includes the generally L-shaped first protection member 70 and the rectangular second protection member 80. The first protection member 70 includes the main body 70a, the first support 71 formed in front of (right side in FIG. 1) of the main body 70a, and a support base 71a.

An upper surface of the first support 71 serves as a mount 79 on which the suspensions 20 and the actuator block 30 of the HSA 10 are mounted and supported. The circular insertion hole 72 and the circular concave hole 73 adjacent each other are formed in the side surface of the first support 71. Using the circular insertion hole 72 and the circular concave hole 73, the protection clip 100 is attached to the HSA protecting apparatus 60.

The connector support 74 is provided on the upper surface (upper side in FIGS. 1 to 6) of the main body 70a. A first fitting member 76 is fixedly attached to an inner side surface 70b of the main body 70a. The first fitting member 76 is used when an open/close mechanism 90 is constituted by the first protection member 70 and the second protection member 80. An insertion hole 77 is formed in the first fitting member 76. The first fitting member 76 can be fitted into second fitting members 84 and 85 formed in an inner side surface 80b of the main body 80a of the second protection member 80.

Namely, the second protection member 80 is constituted by the main body 80a and an engagement plate 81 that forms a front surface of the main body 80a. An engagement piece 82 that extends inward is formed on a part of the engagement plate 81. The engagement piece 82 is engaged with a concave portion 71b formed in the first protection member 70 when the first protection member 70 and the second protection member 80 are closed toward each other. The engagement piece 82 acts as a member that changes the attachment/detachment angle of the actuator block 30 including the L-connector 36 and the actuator unit 25 at which angle the actuator block 30 is attached or detached.

The connector lock 83 is provided on the upper surface of the main body 80a (upper side in FIG. 6). The paired upper and lower second fitting members 84 and 85 that constitute the open/close mechanism 90 are fixedly provided on the inner side surface 80b of the main body 80a of the second protection member 80. Insertion holes 86 and 87 are formed in the second fitting members 84 and 85, respectively as shown in FIG. 6. The second fitting members 84 and 85 can be fitted into the first fitting member 76 (see FIG. 5) formed in the inner side surface 70b of the main body 70a of the first protection member 70.

Namely, the open/close mechanism 90 operates when the first fitting member 76 provided on the inner side surface 70b of the main body 70a of the first protection member 70 is fitted into the paired second fitting members 84 and 85 provided on the inner side surface 80b of the main body 80a of the second protection member 80. Furthermore, the open/close mechanism 90 rotates about a rotational pin (not shown) inserted into the insertion holes 77, 86, and 87 formed in the first fitting member 76 and the second fitting members 84 and 85, respectively.

Moreover, a compression spring 151 (see FIG. 3) is provided between the inner side surfaces 70b and 80b of the main bodies 70a and 80a of the first and second protection members 70 and 80, respectively. The compression spring 151 enables the first protection member 70 and the second protection member 80 that constitute the open/close mechanism 90 to be freely opened and closed against the elastic force of the compression spring 151. Both ends of the compression spring 151 are fitted into circular concave holes 75 and 88 formed in the inner side surfaces 70b and 80b of the first and second protection members 70 and 80, respectively.

Figure 7:
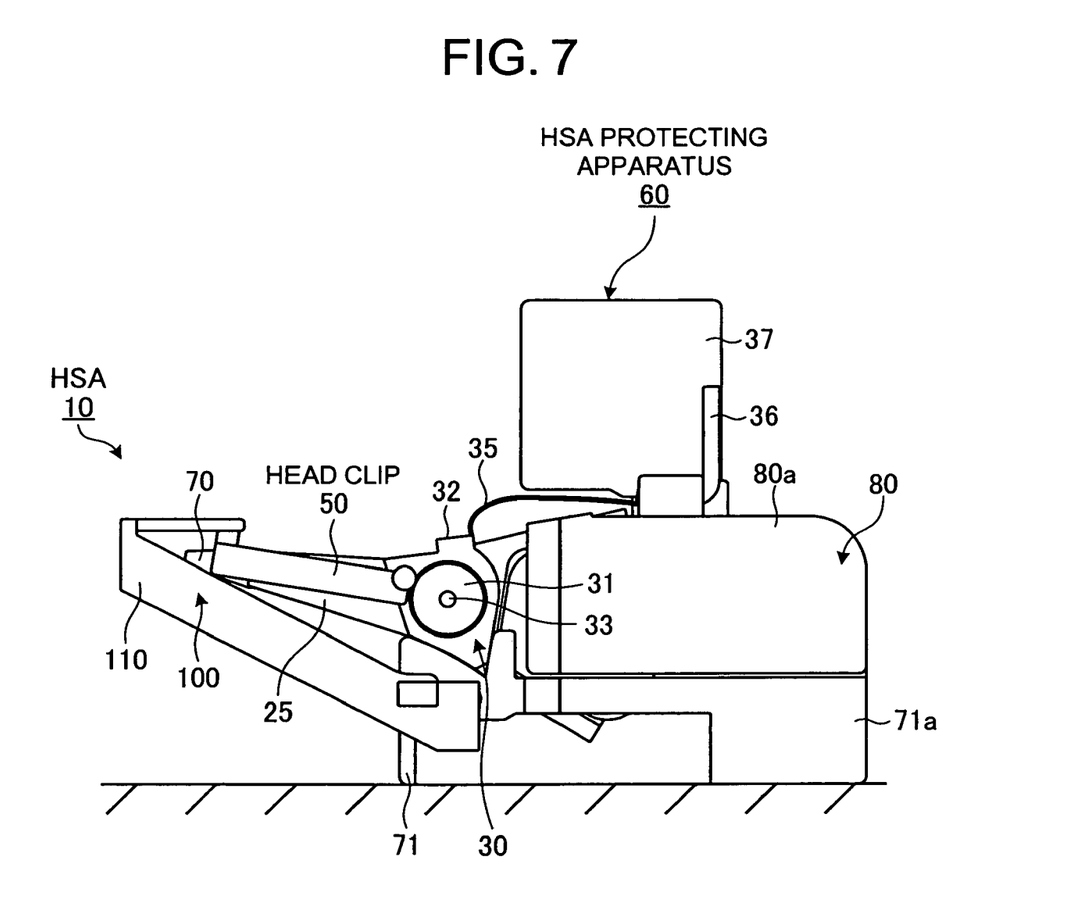
FIG. 7 is a front view of the HSA protecting apparatus for explaining a disposed state of the HSA protecting apparatus.

FIG. 7 is a front view of the HSA protecting apparatus 60 on which the HSA 10 is mounted. As shown in FIG. 7, if the HSA 10 is mounted on the HSA protecting apparatus 60, the HSA protecting apparatus 60 on which the HSA 10 is mounted can be disposed on a flat portion in a self-standing manner by the first support 71 and the support base 71a of the first protection member 70. It is, therefore, possible to stably protect the HSA 10.

Specifically, if the HSA 10 is mounted on the HSA protecting apparatus 60 and the first protection member 70 and the second protection member 80 are closed toward each other, the HSA protecting apparatus 60 can be provided in the self-standing manner by the first support 71 and the support base 71a. Moreover, while each HSA 10 is mounted on the HSA protecting apparatus 60, a plurality of manufactured HSAs 10 can be stored while being mounted on the flat portion.

Figure 8:
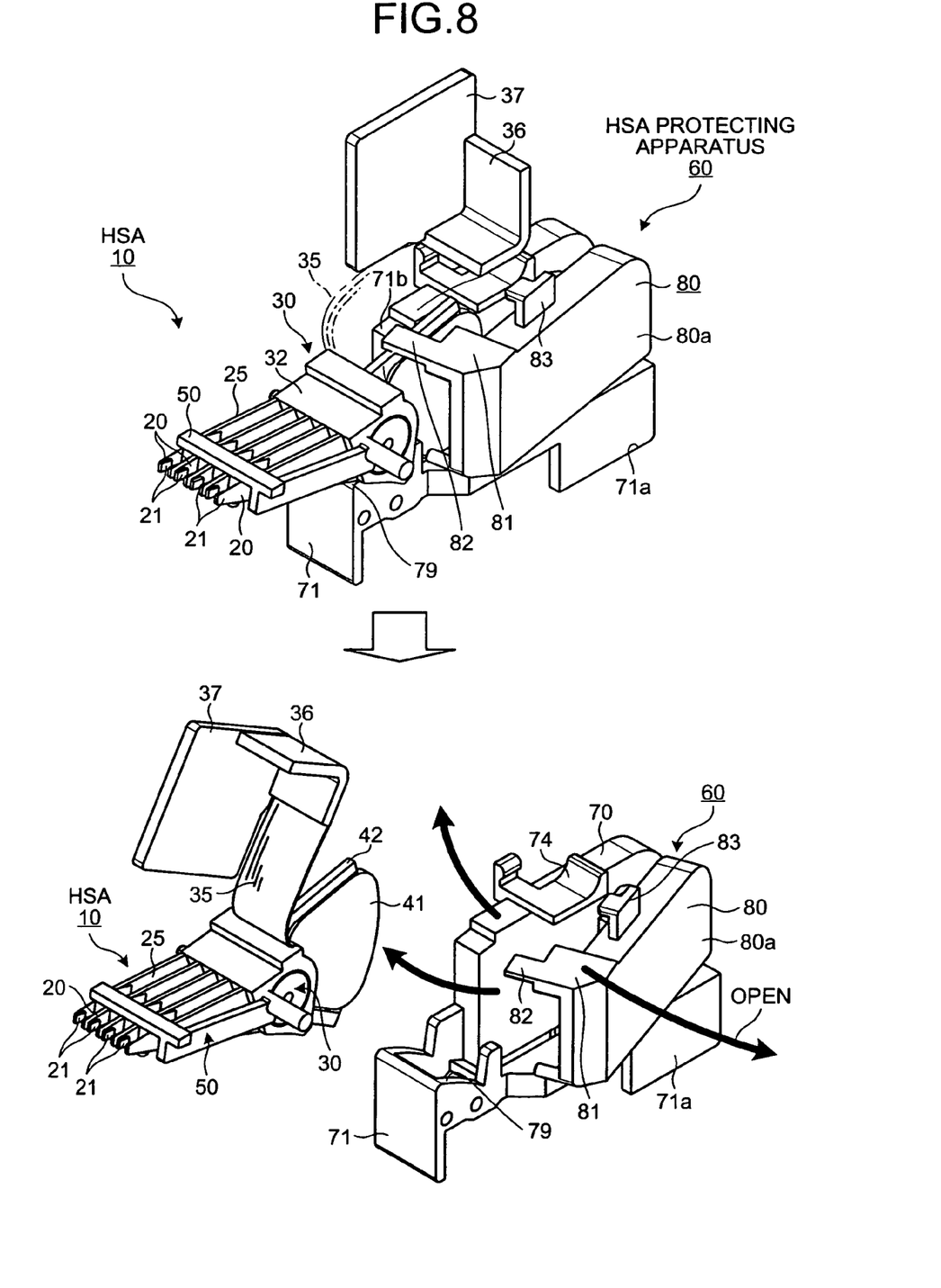
FIG. 8 is a perspective view of the HSA and the HSA protecting apparatus for explaining states in which the HSA and a connector are attached to and detached from the HSA protecting apparatus.
Figure 9:
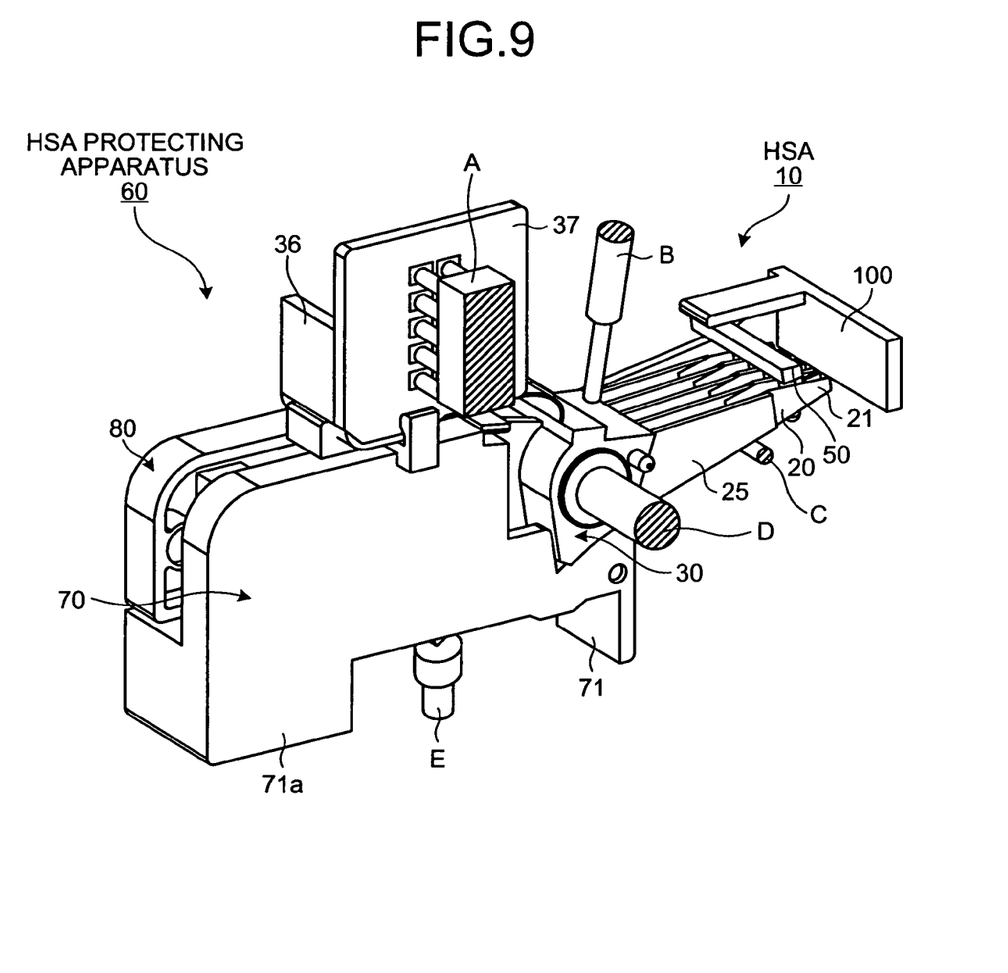
FIG. 9 is a schematic for explaining the relationship between the HSA protecting apparatus and assembly components.

FIG. 8 is a perspective view of the HSA protecting apparatus 60 and the HSA 10 for explaining a state of attaching the actuator block 30 and the L-connector 36 to the HSA protecting apparatus 60 and the HSA 10 is detached from the HSA protecting apparatus 60. FIG. 9 is a schematic of the HSA protecting apparatus 60 and the HSA 10 for explaining the relationship between the HSA protecting apparatus 60 and assembly components.

As shown in FIG. 8, if the HSA 10 is to be detached from the HSA protecting apparatus 60, rear ends of the first protection member 70 and the second protection member 80 are pressed inward by the user's hand. By doing so, the first protection member 70 and the second protection member 80 can be rotated around the first fitting member 76 and the second fitting members 84 and 85 that constitute the open/close mechanism 90 against the elastic force of the compression spring 151. The HSA 10 can be detached from the HSA protecting apparatus 60 by releasing tip ends of the first protection member 70 and the second protection member 80.

According to the present embodiment, the attachment/detachment angle of the actuator unit 25 including the suspensions 20 and that of the L-connector 36 can be independently changed using the engagement piece 82 provided on the engagement plate 81 of the second protection member 80. Accordingly, the actuator block 30 including the actuator unit 25 and the L-connector 36 can be independently detached from the HSA protecting apparatus 60 in a sequential manner.

As shown in FIG. 9, components A to E are part of constituent elements of an assembling apparatus that assembles the HSA 10. The HSA 10 can be attached to the assembly components of the assembling apparatus while being mounted on the HSA protecting apparatus 60.

As explained above, the first protection member 70 that constitutes the HSA protecting apparatus 60 according to the present embodiment includes the first support 71 that supports part of the actuator unit 25 including the suspensions 20 and the connector support 74 that supports the L-connector 36 provided on one end of the FPC cable 35 extending from part of the actuator unit 25. The second protection member 80 includes the connector lock 83 that fixes the L-connector 36 supported by the connector support 74. It is, therefore, possible to prevent deformation of the suspensions 20 due to the contact of the suspensions 20 with the outside during the transport of the HSA 10 accompanying the manufacturing of the HSA 10.

Moreover, the protection clip 100 can be attached to the HSA protecting apparatus 60. It is, therefore, possible to ensure that the suspensions 20 and the magnetic heads 21 fixed to the respective suspensions 20 of the HSA 10 can be protected and that the detachment of the head clip 50 can be prevented. It is also possible to ensure that the deformation of the suspensions 20, the damage of the magnetic heads 21 and the like during the manufacturing and transport of the HSA 10 can be prevented. It is to be noted that the present invention can be applied to a head assembly that has the same configuration as that of the magnetic head suspension assembly for the HDD, and that is used for an optical disk apparatus or a magneto-optical disk apparatus including optical heads or magnetooptical heads.

As described above, according to an embodiment of the present invention, it is possible to prevent an operator from directly touching the head suspension assembly during assembly, manufacturing, and transport of the head suspension assembly. It is possible to prevent deformation, damage and the like of the suspensions due to the contact of the suspensions 20 with the outside. It is also possible to prevent deformation, damage and the like of the suspensions during transport of the head suspension assembly accompanying the manufacturing of the head suspension assembly.

Furthermore, according to an embodiment of the present invention, it is possible to ensure preventing the ESD breakdown, the adhesion of dust, the deformation of the suspensions, the damage of the magnetic heads and the like due to operator's direct touching the head suspension assembly. Product yield can be thereby improved.

Moreover, according to an embodiment of the present invention, the first support unit provided in the first protection member can support part of the actuator unit including a plurality of suspensions. The second support unit provided in the first protection member can support the connector provided at the cable extending from part of the actuator unit. It is, therefore, possible to ensure protecting the actuator unit including the suspensions and the connector.

Furthermore, according to an embodiment of the present invention, if the head suspension assembly is mounted on the protecting apparatus, the protecting apparatus can be disposed in a flat portion in a self-standing manner by a pair of supporting units. It is, therefore, possible to protect the head suspension assembly in a stable state. It is also possible to store a plurality of manufactured head suspension assemblies while mounting each head suspension assembly on the protecting apparatus.

Moreover, according to an embodiment of the present invention, the attachment/detachment angle adjusting unit individually adjust the attachment/detachment angle of the actuator unit including the suspensions and that of the connector. Therefore, the attachment/detachment angle of the actuator unit including the suspensions and that of the connector can be changed. It is thereby possible to individually and sequentially attach/detach the actuator block including the actuator unit and the connector.

Furthermore, according to an embodiment of the present invention, the detachment preventing unit can ensure preventing detachment of the head clip.

Moreover, according to an embodiment of the present invention, if the detachment preventing unit is attached to the protecting apparatus, it is possible to ensure preventing detachment of the protection clip due to certain external force or contact of the protection clip with the other member.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An apparatus for protecting a head suspension assembly that includes an actuator unit including a plurality of suspensions to which a plurality of heads are fixed, respectively, an actuator block, and a coil-arm unit including a coil, the apparatus comprising:
a first protection member including
a first support unit that supports a part of the actuator unit; and
a second support unit that supports a connector provided at a cable extending from a part of the actuator unit; and
a second protection member including a fixing unit that fixes the connector to a predetermined position, wherein
the first protection member and the second protection member are formed in freely opening and closing manner.

2. The apparatus according to claim 1, wherein
either one of the first protection member and the second protection member includes a pair of supporting units that dispose the apparatus on a flat portion in a standing state when the head suspension assembly is mounted on the apparatus following a close of the first protection member and the second protection member.

3. The apparatus according to claim 1, wherein
either one of the first protection member and the second protection member includes an angle adjusting unit that adjusts attachment/detachment angles of the actuator unit and the connector.

4. The apparatus according to claim 1, wherein
the head suspension assembly includes a head clip that protects the actuator unit, and
a detachment preventing unit that prevents detachment of the head clip is detachably provided in the apparatus.

5. The apparatus according to claim 4, wherein
a head protecting unit that protects the heads is formed on the detachment preventing unit.

6. The apparatus according to claim 4, wherein
a fitting convex portion that is fitted into a fitting concave portion formed at a predetermined position on the apparatus is formed at a predetermined position on the detachment preventing unit.

* * * * *